(12) United States Patent
Gorski (10) Patent No.: US 7,073,477 B2
(45) Date of Patent: Jul. 11, 2006

(54) GORSKI ROTARY ENGINE

(76) Inventor: Raymond W. Gorski, 3056 North Rd., Sherman, NY (US) 14781

( * ) Notice: Subject to any disclaimer, the term of this patent is extended or adjusted under 35 U.S.C. 154(b) by 0 days.

(21) Appl. No.: 10/869,108

(22) Filed: Jun. 15, 2004

(65) Prior Publication Data

US 2005/0274350 A1     Dec. 15, 2005

(51) Int. Cl.
F02B 53/00 (2006.01)
F01C 1/00 (2006.01)
F03C 2/00 (2006.01)
F04C 2/00 (2006.01)
F04C 18/00 (2006.01)

(52) U.S. Cl. ............... 123/231; 123/204; 123/248; 418/255; 418/261; 418/268

(58) Field of Classification Search ........ 123/240–243, 123/231, 200, 204, 248; 418/235, 79, 81, 418/82, 261, 255, 138, 268
See application file for complete search history.

(56) References Cited

U.S. PATENT DOCUMENTS

| | | | | | |
|---|---|---|---|---|---|
| 787,988 | A | * | 4/1905 | Moore | 418/225 |
| 2,048,825 | A | * | 7/1936 | Smelser | 123/231 |
| 2,129,431 | A | * | 9/1938 | Lambin | 418/138 |
| 2,448,233 | A | * | 8/1948 | Nyborg | 418/255 |
| 2,495,771 | A | * | 1/1950 | Richer | 418/255 |
| 2,712,222 | A | * | 7/1955 | Wilson | 418/261 |
| 3,057,157 | A | * | 10/1962 | Close | 123/204 |
| 3,513,477 | A | * | 5/1970 | Hayashi | 418/208 |
| 3,744,926 | A | * | 7/1973 | Hedges | 415/92 |
| 3,837,320 | A | * | 9/1974 | Maekawa | 123/242 |
| 4,212,282 | A | * | 7/1980 | Apanovitch | 123/204 |
| 4,385,873 | A | * | 5/1983 | Richter | 418/255 |
| 4,667,468 | A | * | 5/1987 | Hansen | 123/248 |
| 4,744,738 | A | * | 5/1988 | Miki et al. | 418/126 |
| 5,181,490 | A | * | 1/1993 | Ruzic | 123/243 |
| 6,106,255 | A | * | 8/2000 | Viegas et al. | 418/268 |
| 6,120,273 | A | * | 9/2000 | Mallen | 418/255 |

* cited by examiner

Primary Examiner—Thai-Ba Trieu
(74) Attorney, Agent, or Firm—Richard K Thomson (57) ABSTRACT

A rotary engine is provided with solid vanes which extend through the rotor and engage opposing interior wall portions of the stator housing. A series of grooves in the interior wall permit the expanding exhaust gases to by-pass the minimal surface area of vanes proximate to the combustion chamber to engage the larger surface area of a vane which is protruding more significantly from the rotor. This robust rotary engine is preferably made of cast iron, having internal portions coated with ceramic so that it readily can operate at temperatures exceeding 850° F. The heat energy is utilized to obtain maximum productive work rather than being discarded as a waste product as is typical with most state of the art power plants, resulting in an efficiency rating exceeding 60%.

19 Claims, 8 Drawing Sheets

GORSKI ROTARY ENGINE

BACKGROUND AND SUMMARY OF THE INVENTION

The present invention is directed to the field of power plants. More particularly, the present invention is directed to a fuel efficient rotary engine having an efficiency rating exceeding 60%.

Recently, fuel costs have skyrocketed to in excess of $2.00 per gallon. This has led to an increase in popularity of hybrid cars which use electric motors to reduce the amount of fuel consumed. This approach is basically a "band-aid solution" to a problem requiring surgery. Conventional gasoline engines have overall efficiencies which are, typically, less than 25% for a conventional V-8 engine. This is due in large part to the fact that the engine is water cooled to remove the heat. Internal combustion engines produce heat, a form of energy which, instead of being used to perform work, is discarded as a waste product. With rising fuel costs which result from increase world-wide demand placed on limited resources, it is imperative that more efficient power plants be developed to obtain greater overall work from our limited fuel supplies.

The rotary engine of the present invention is capable of producing efficiency ratings which exceed 65%. This engine, instead of throwing away the heat as an unwanted by-product of combustion, employs the heat to produce work. This engine, which is made of cast iron with interior portions of the housing being coated with ceramic and the outside enshrouded with insulation, operates at temperatures which exceed 850° F. Accordingly, water can be injected into the combustion chamber, in addition to the fuel, producing superheated steam which expands to drive the vanes of the rotary engine significantly reducing the amount of fuel needed to do the same amount of work.

The rotary engine of the present invention comprises a) a cylindrical housing having a peripheral wall with an internal surface; b) a rotor offset within the housing; c) a plurality of vanes associated with the rotor in a manner such that the vanes rotate with the rotor while permitting radial sliding movement relative thereto; d) an intake orifice; e) an exhaust orifice; f) a plurality of grooves in the internal surface of the peripheral wall beginning downstream of the intake orifice, the plurality of grooves extending over a distance generally equal to one quadrant of the peripheral wall; whereby expanding gases can bypass at least one proximate vane to engage a vane at a greater distance from the intake orifice.

Preferably, the plurality of vanes are comprised of solid vane members which extend through the rotor simultaneously engaging opposing portions of the peripheral wall. A plurality of roller bearings engage lateral portions of each of the vane members facilitating their radial sliding movement. Most preferably, the plurality of rollers bearings comprise at least two pairs of roller bearings engaging each vane member, a first roller bearing of a first pair engaging a first side of the vane member at a first end, a second roller bearing of the first pair engaging a second side of the vane member at the first end, a first roller bearing of a second pair engaging a first side of said vane member at a second end, a second roller bearing of the second pair engaging the second side of the vane member at the second end.

In the preferred embodiment, the plurality of vanes comprise two vanes which extend through the rotor, each vane having a portion of a central panel of the vane removed to permit clearance relative to the other the vane. The housing is preferably made of cast iron and has a ceramic coating on the internal surfaces as well as on a major portion of the external surfaces of the rotor. An output drive shaft attached to said rotor allows power takeoff from said rotary engine.

In another aspect of the present invention, the robust rotary engine operates at temperatures exceeding 850° F. and comprises an uncooled cylindrical housing having a peripheral wall with an internal surface; a rotor offset within said housing; a plurality of vanes associated with said rotor in a manner such that said vanes rotate with said rotor while permitting radial sliding movement relative thereto; an intake orifice; an exhaust orifice; whereby temperatures within said uncooled cylindrical housing can reach temperatures exceeding 850° F. As formerly, the internal wall of the rotary combustion engine has a plurality of grooves extending over a distance generally equal to one quadrant of said peripheral wall to permit expanding gases to bypass at least one proximate vane to engage a vane at a greater distance from the intake orifice. In this same quadrant, a plurality of injection ports are positioned about a periphery of said rotary housing along the length of the grooves for injection of at least one of substances selected from a group consisting of fuel and water. In actual practice, some injection ports will be used to supply hydrocarbon fuels selected from the group consisting of gasoline, diesel fuel, and substitute hybrid hydrocarbons, while other ports are used to inject water. Water will only be injected when the engine is operating at temperatures exceeding 850° F., such that the water becomes superheated steam expanding to drive the vanes of the rotary engine in a much more fuel efficient manner than has been known heretofore.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
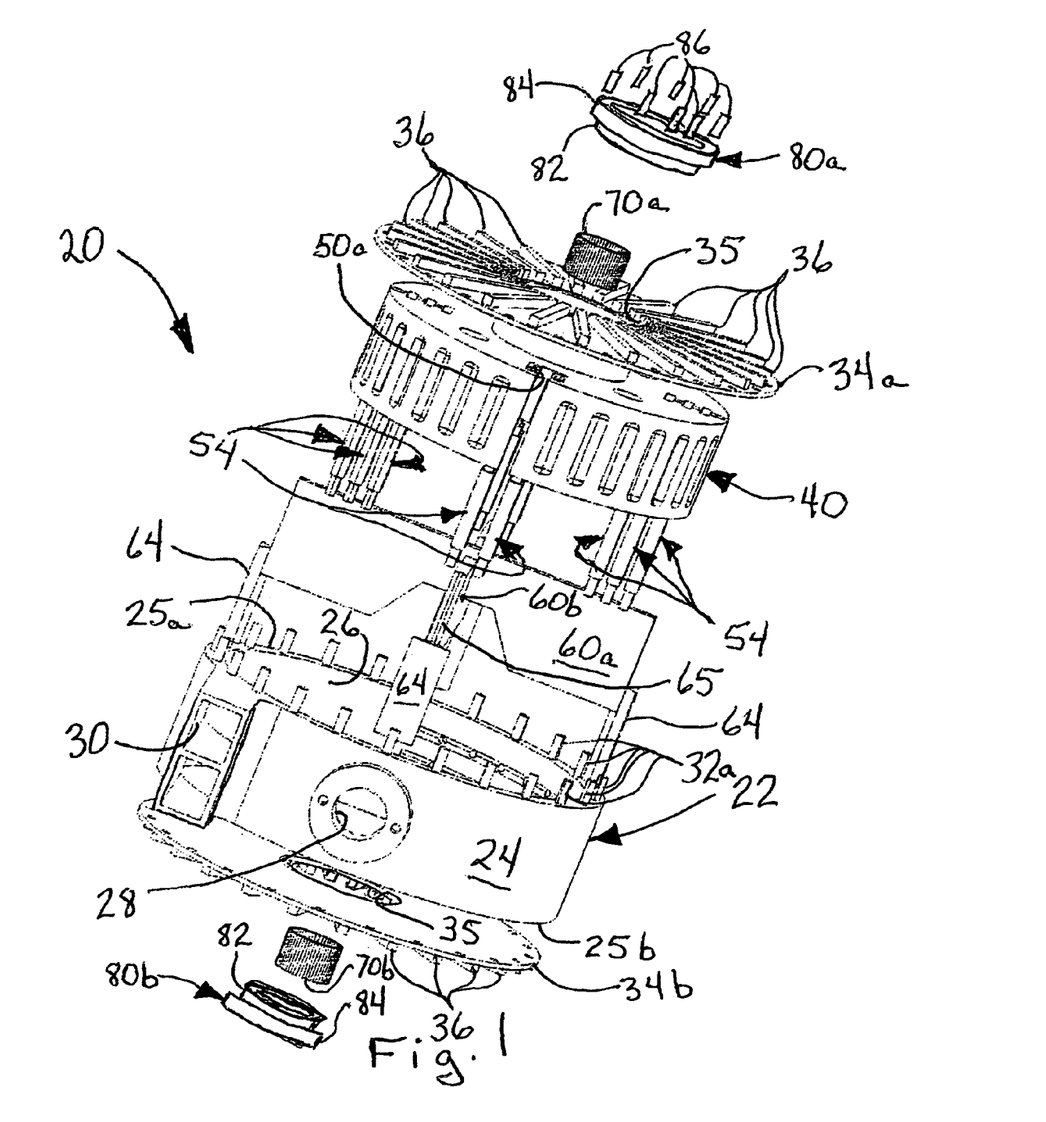
FIG. 1 is an exploded perspective view of a first embodiment of the rotary engine of the present invention.
Figure 2:
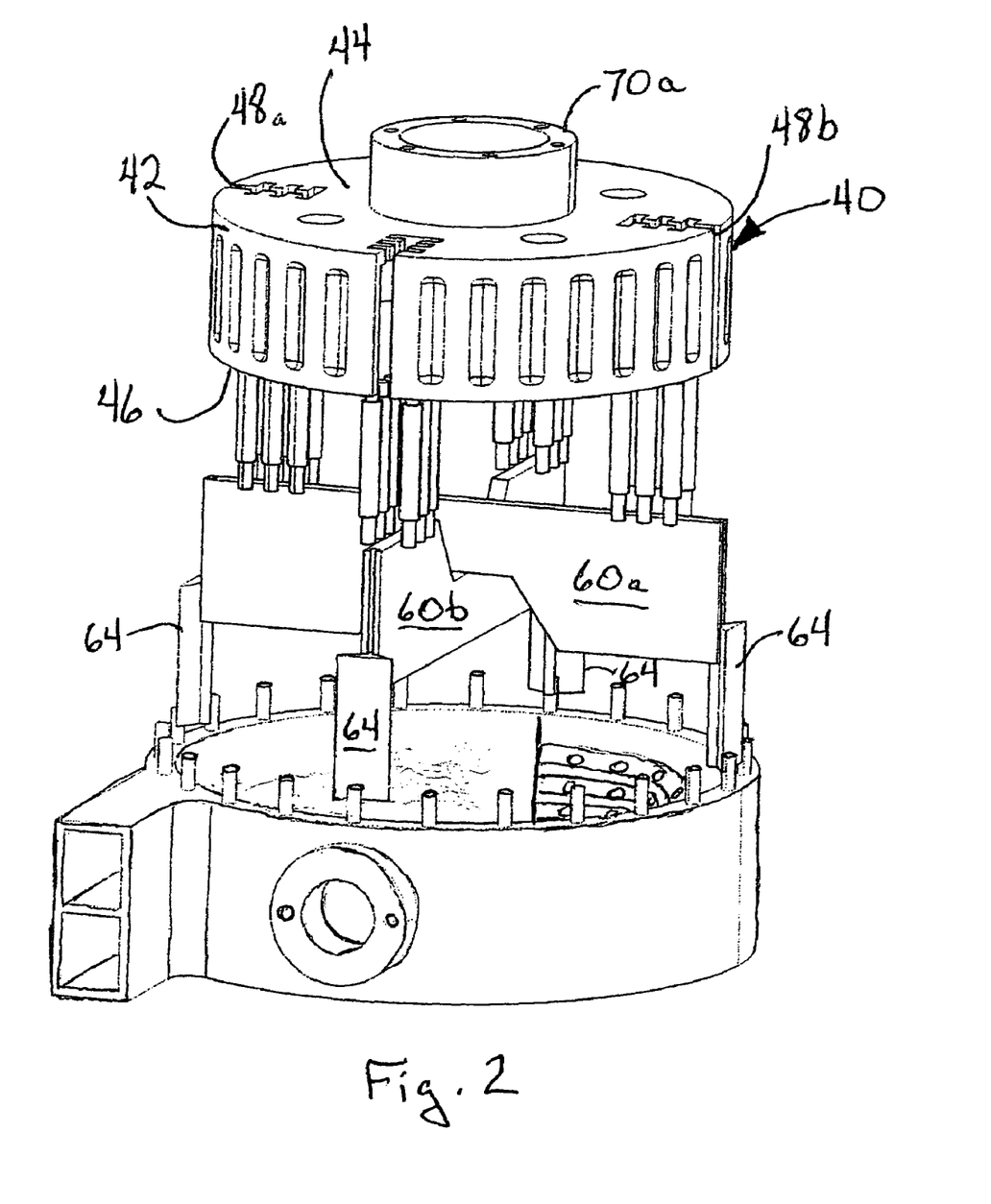
FIG. 2 is an exploded perspective view of the rotor and housing assembly of the first embodiment with the end plates removed.
Figure 3:
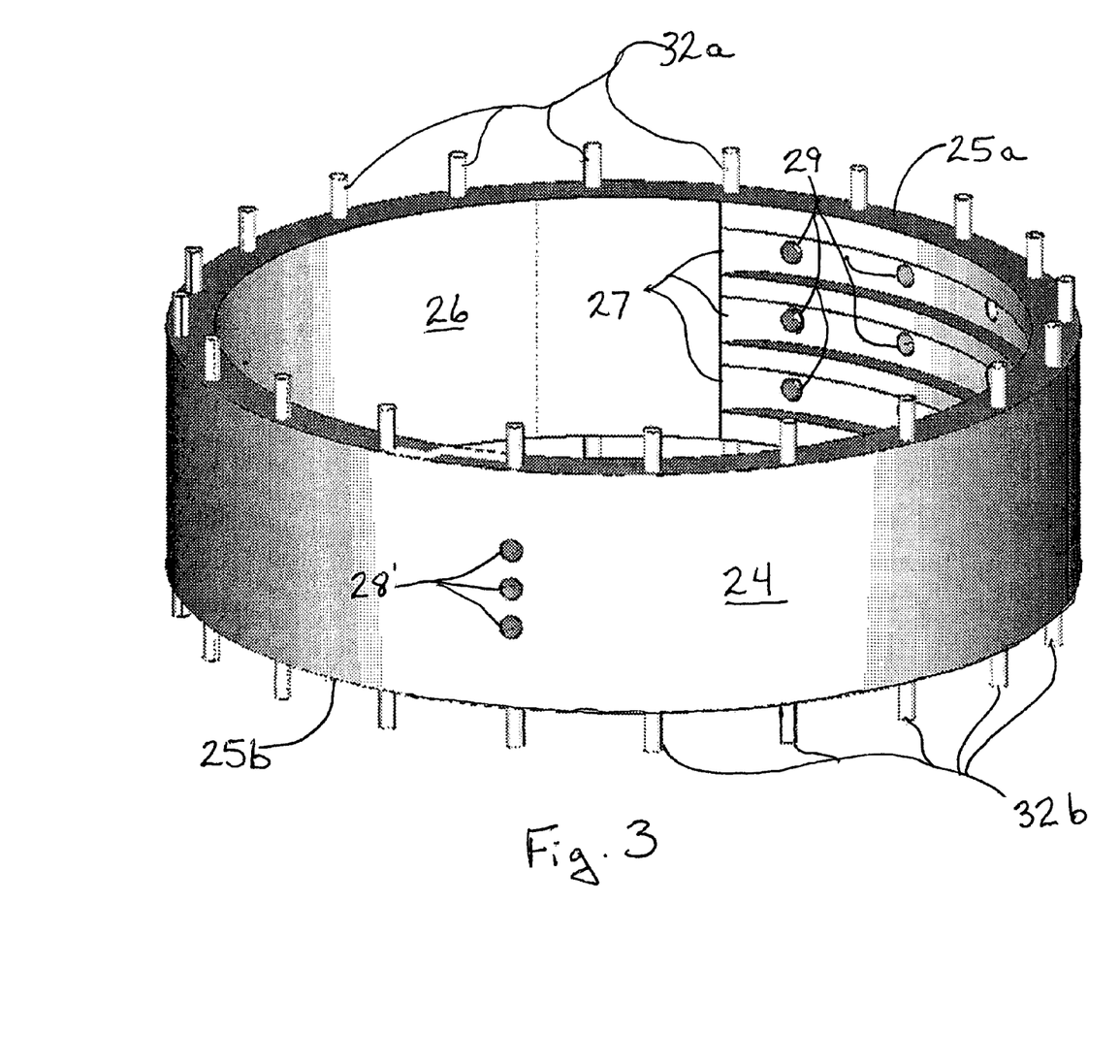
FIG. 3 is an enlarged perspective view of a second embodiment of the housing.

A first embodiment of the Gorski rotary engine of the invention is shown in FIGS. 1 and 2 generally at 20. Rotary engine 20 comprises a cylindrical housing 22 having a peripheral wall 24 with an internal surface 26 which is preferably coated with a ceramic coating. Housing 22 has an intake orifice 28 and an exhaust port 30. Pressurized air will be fed through intake orifice 28 generally in a range of between 14 and 150 psi. The intake orifice 28 is shown in FIG. 1 as a single large diameter opening while in the second embodiment of FIG. 3, intake orifices 28' are shown as a plurality of small diameter openings. A plurality of threaded attachment posts 32a and 32b are attached to upper (25a) and lower (25b) edges (FIG. 3) of peripheral wall 24 allowing top (34a) and bottom (34b) plates to be bolted thereto. Top plate 34a and bottom plate 34b have a plurality of radially extending ribs 36 to resist warping thereof. Internal surface 26 of housing 22 has a plurality of grooves 27, depicted in FIG. 3 as three, although 2–5 are contemplated, depending on the size of the engine. Grooves 27 extend around about ¼ of the periphery of internal surface 26 over what is the second quadrant of housing 22. Grooves 27 are critical to the performance of engine 20, which would not function in their absence. A plurality of injection ports 29 are positioned throughout the quadrant containing the grooves 27 and, most preferably, extend into the grooves 27.

Figure 4:
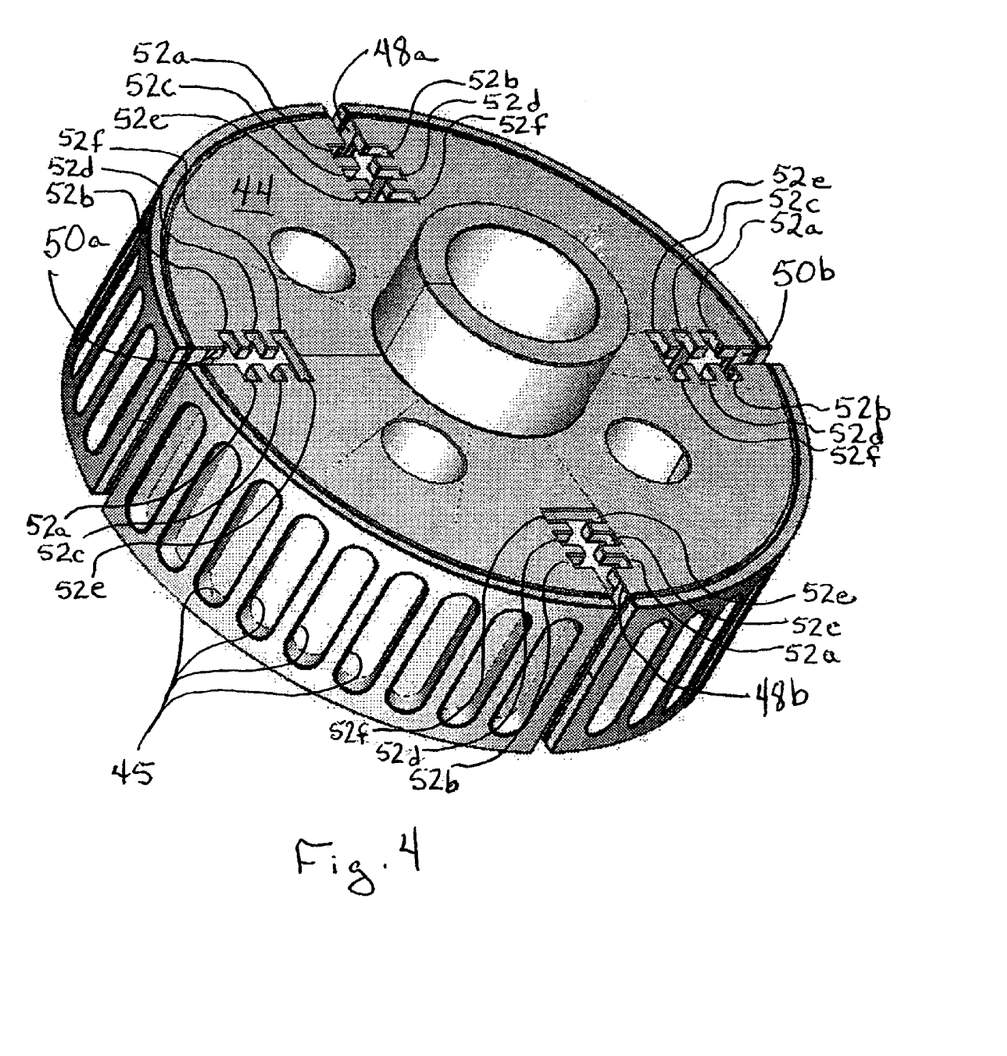
FIG. 4 is an enlarged perspective view of the rotor with the vanes removed.

Rotor 40 (better seen in FIGS. 2, 4, 5) has an external peripheral wall 42, a first side 44 and a second side 46. The external peripheral wall 42 has a series of pockets 45 formed therein for receiving and carrying intake air from intake orifice 28 and carrying it as rotor 40 rotates. First and second sides 44, 46 each have opposing slots 48a, 48b and 50a and 50b which receive vanes 60a and 60b therein, respectively.

Figure 5:
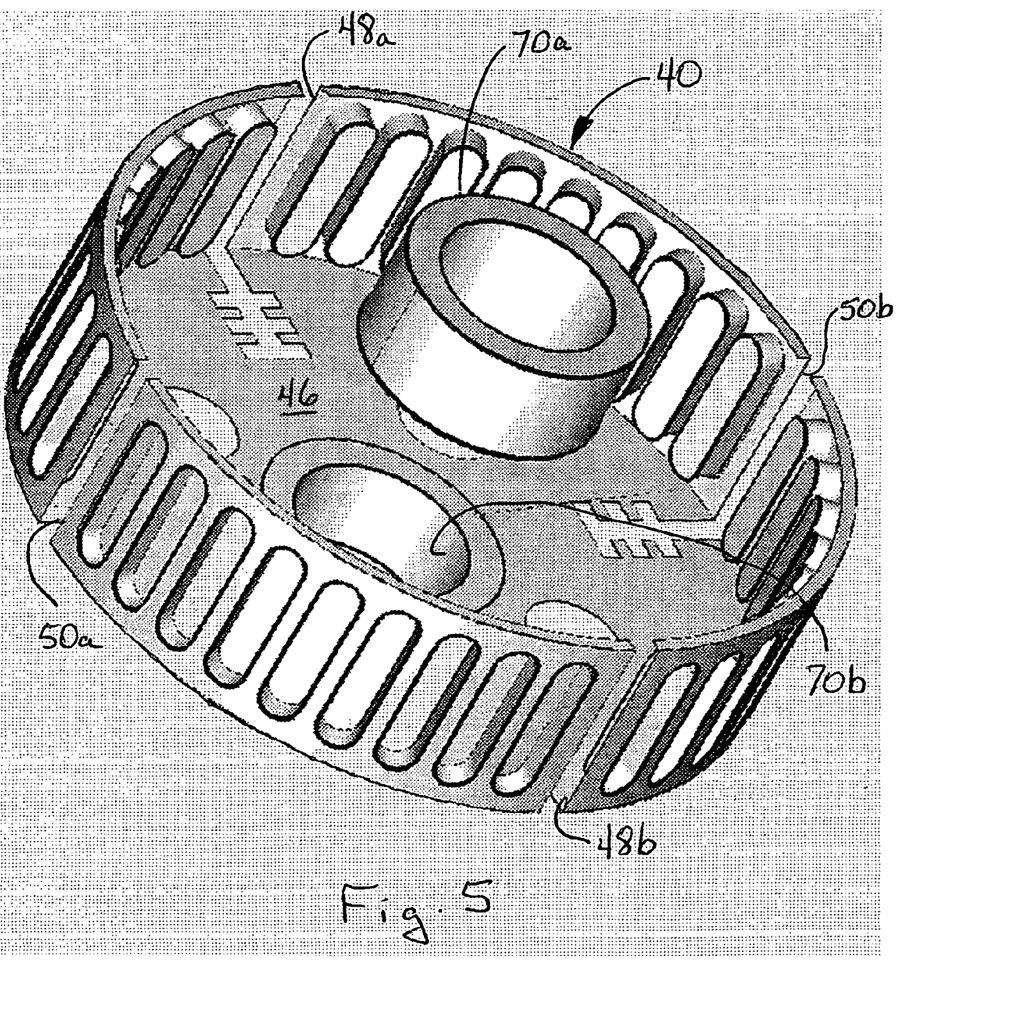
FIG. 5 is an enlarged perspective view of the rotor with one of the sides removed.

Rotor 40 is made in several pieces to facilitate assembly and to reduce temperatures within the rotor in order to, in part, protect components such as the bearings 54 from the temperatures within the combustion chamber. As best seen in FIG. 5, rotor 40 has an open construction with power take off sleeves 70a and 70b being attached to first (44) and second (46) sides, respectively. Vanes 60a, 60b (seen more clearly in FIG. 6) are solid extending through rotor 40 and, in fact simultaneously contacting both sides of internal surface 26 of cylindrical housing 22. These features will be more fully appreciated when the operation of the engine is described in conjunction with FIG. 8, infra. Ends 61 and 63 of vanes 60a and 60b have slits 65 into which are mounted seals 64 which engage the internal surface 26 of housing 22. Seals 64 are made of cast iron with a coating of ceramic and, as inferred in FIG. 1, have flanges which are slid axially into slits 65. It is noted that the demands on these seals is not as great as in other engines given that the normal operating pressure within the combustion chamber is only a fraction of what is found in those engines. Use of seals can be obviated through use of tight tolerances (0.002 inch) in machining of the housing 22 and rotor 40, but are provided to reduce machining costs.

Figure 7:
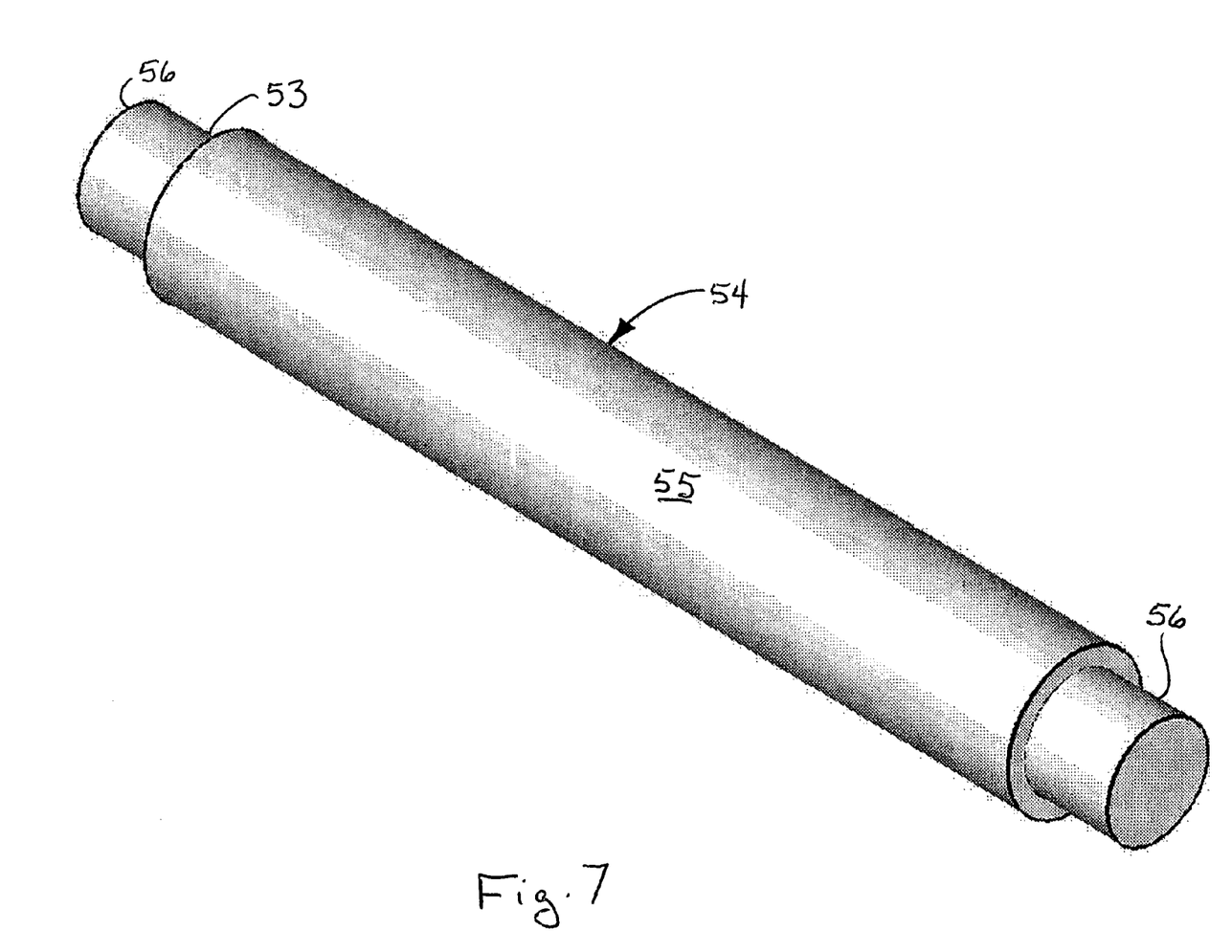
FIG. 7 is an enlarged perspective view of one of the bearings.

Slots 48a, 48b, 50a, 50b have three pairs of lateral recesses 52a and 52b, 52c and 52d, 52e and 52f. At least two opposing recesses have roller bearings 54 captured therein; one, two or three pairs (FIGS. 1, 2) may be occupied by roller bearings 54, depending on the size of rotor 40 and, hence, the length/weight of vanes 60a, 60b. It will be understood that the Gorski rotary engine 20 can be built having rotors which are 4" (lawn trimmer application) in diameter or 4' (diesel locomotive) depending on the power needed. Roller bearings 54 are preferably (FIG. 7) hollow steel cylinders 53 having enlarged portions 55 protected ceramic sleeves, the hollow cylinders being filled with oil. The ends 56 of roller bearings 54 are received in pairs of recesses 52a and 52b, 52c and 52d, 52e and 52f, with the enlarged portion 55 preventing axial movement of the roller bearings 54 so that they are captured in their recesses and retained against lateral movement by the presence of vanes 60a and 60b.

Figure 6:
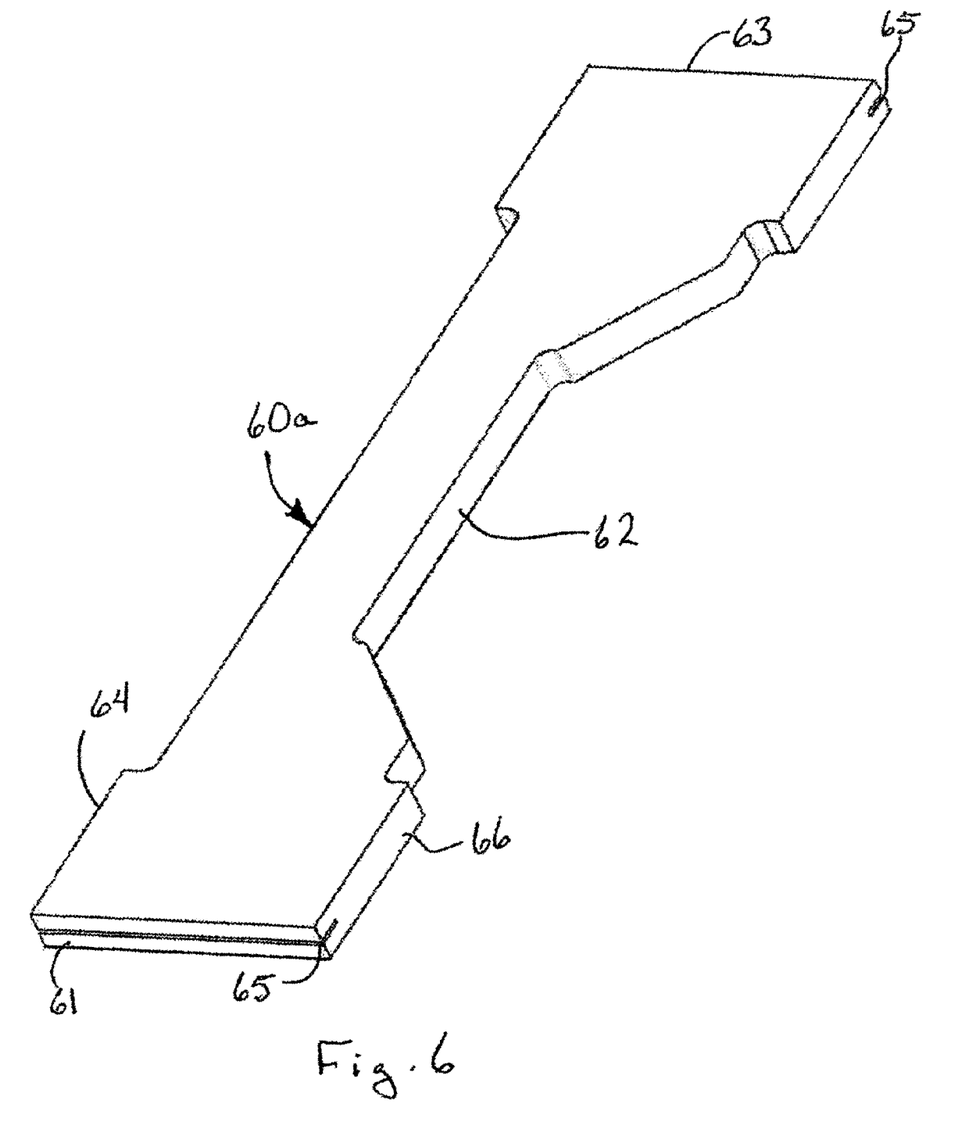
FIG. 6 is an enlarged perspective view of one of the vanes.

As seen in FIG. 6, a portion 62 of a central panel of each vane 60a and 60b is carved out. One of the vanes 60a and 60b will have first side 64 extending upwardly while the other of the vanes 60a and 60b has second side 66 extending upwardly so there is no interference between the vanes 60a and 60b as they slide in orthogonal radial directions in slots 48a, 48b, 50a, 50b, respectively, facilitated by the contact of at least one, and as many as three, roller bearings 54 with each lateral face of vanes 60a and 60b. It will be understood that once rotor 40 is assembled, roller bearings 54 are internally captured therein and the exploded depiction in FIGS. 1 and 2 is merely to facilitate explanation of the rotary engine 20.

Two eccentric bearings 80a, 80b are clamped to plates 34a and 34b in a desired rotational position to provide the desired relationship between rotor 40 and internal surface 26 of peripheral wall 24. The reduced diameter innermost wall 82 which fits within opening 35 in plates 34a and 34b has a varying wall thickness, being 0.050 inch wider on one side than on the other with a smooth taper interconnecting the two regions in each rotational direction. This tapered region can create up to 0.100 inch difference in the placement of rotor 40 within housing 22 to optimize performance of rotary engine 20. A plurality of roller bearings 86 are seated in outermost wall 84 of bearings 80a, 80b and engage power takeoff sleeves 70a, 70b (FIGS. 1, 8) which is attached to faces 44 and 46 of rotor 40, respectively. Power takeoff sleeves 70a, 70b have a plurality of bolt holes 71 which permit attachment to an element to be driven (not shown) such as a drive shaft, for example.

Figure 8:
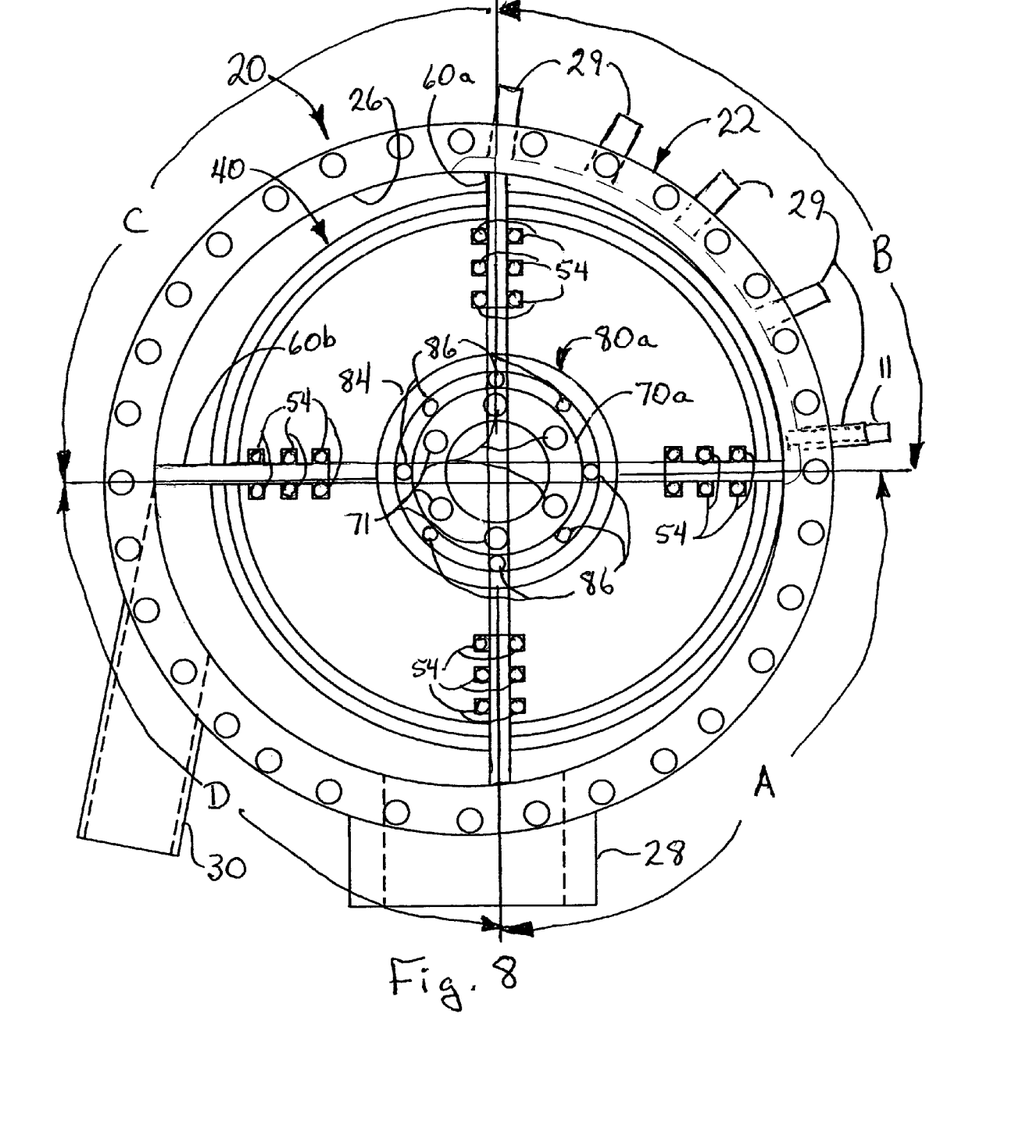
FIG. 8 is a schematic side view with one of the end plates removed to permit the operation of the engine to be described.

The operation of Gorski rotary engine 20 will be described in conjunction with FIG. 8. Rotary engine 20 can burn any fuel which can be injected through ports 29, e.g., gas, diesel, propane, natural gas, jet fuel. In the outlet end of injection ports 29 are positioned atomizers (not shown) which turn the input fluid into a fine particulate (atomized) spray for enhanced combustion. Pressurized air in a range between 14 and 150 psi is pumped through inlet 28. Injected air is captivated in pockets 45 and carried from the first quadrant A to second quadrant B where the grooves 27 enable the air and combustion gases developed in second quadrant B to by-pass at least one vane 60a, 60b to engage a vane farther downstream which has greater surface area exposed to maximize the rotational force achieved by burning the fuel. A heated rod 11 attached to one of the three first column of injection ports 29 will initiate combustion within quadrant B which will continue to burn as long as additional fuel is added to the combustion chamber (quadrant B). The rotary engine 20 depicted in FIGS. 1–8, has 15 injection ports, five columns of three, although more or fewer can be used, again, depending on the size of the engine 20. More typically, engine 20 will be manufactured with a standard number of orifices 29, 15 for example, and as many as needed for the application will be activated.

Vanes 60a, 60b slide freely within rotor 40 as it turns, vanes 60a and 60b being moved longitudinally by contact of their ends (which optionally include seals 64) with the internal surface 26 of housing 22 as at least one pair, and as many as three pair, of roller bearings 54 engage opposite side portions of vanes 60a, 60b. As can be seen, the vanes 60a, 60b have minimal exposed surface area (essentially no area) between the second half of the first quadrant A through the first half of the second quadrant B. If expanding combustion gases were to engage the minimal surface area of the trailing ends of vanes, the rotor 40 would not rotate and no work would be achieved as a result of the combustion. Since grooves 27 permit the combusted gases to surge past these minimal vanes to engage the leading end of vane 60b in quadrant C (as seen in FIG. 8), maximum exposed vane surface area is engaged and maximum work done.

One or more of the injection ports 29 can be utilized to inject water into the combustion chamber (quadrant B). This water injection can be set up to occur automatically when the operation temperature of the chamber exceeds 850° F. The atomized water particles will instantaneously become superheated steam, expanding to drive the vanes 60a, 60b for a fraction of the cost of fuel. Expanding combustion gases drive vanes 60a, 60b from the second half of the B quadrant through the first half of the fourth (D) quadrant where they exit the housing 22 through exhaust port 30. While insulation has not been shown since it would merely mask the features of the rotary engine 20, it will be appreciated that insulation will be used to encapsulate the engine to both maximize its utilization in doing work and restrict the flow of heat to places it is not wanted, e.g., the passenger compartment.

Unlike conventional commercial powerplants, the Gorski rotary engine does not discard heat as a waste product of combustion but harnesses it as useful work energy. In addition, in normal operation, the Gorski rotary engine will have an operating pressure which is a fraction of a conventional internal combustion engine. That is to say, this is a variable pressure engine: when the engine is operating at a fraction of full power, it is not at full pressure. The combustion chamber pressure varies with the power requirements. For these reasons, the Gorski engine outperforms the best V-8 engine with an efficiency rating of 27% by a factor of almost 2½, providing an efficiency capable of exceeding 65%.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A rotary engine comprising
   a) a cylindrical housing having a peripheral wall with an internal surface;
   b) a rotor offset within said housing;
   c) a plurality of vanes associated with said rotor in a manner such that said vanes rotate with said rotor while being permitted radial sliding movement relative thereto;
   d) an intake orifice;
   e) an exhaust orifice; and
   f) a plurality of grooves in said internal surface of said peripheral wall beginning downstream of said intake orifice, said plurality of grooves extending over a distance generally equal to one quadrant of said peripheral wall;
   whereby expanding gases bypass at least one proximate vane when an end portion of said proximate vane is in contact with said internal surface, said expanding gases engaging a vane which is not proximate said internal surface.

2. The rotary engine of claim 1 wherein said plurality of vanes are comprised of solid vane members which extend through said rotor simultaneously engaging opposing portions of said peripheral wall.

3. The rotary engine of claim 2 further comprising a plurality of roller bearings which engage lateral portions of each of said vane members facilitating their radial sliding movement.

4. The rotary engine of claim 3 wherein said plurality of rollers bearings comprise at least two pairs of roller bearings engaging each vane member.

5. The rotary engine of claim 1 wherein said plurality of vanes comprise two vanes which extend through said rotor, each said vane having a portion of a central panel of said vane removed to permit clearance relative to another said vane.

6. The rotary engine of claim 1 wherein said rotary housing is made of cast iron.

7. The rotary engine of claim 6 further comprising a ceramic coating on said internal surface of said cast iron rotary housing.

8. The rotary engine of claim 7 further comprising a ceramic coating on at least a major portion of the external surface of said rotor.

9. The rotary engine of claim 1 further comprising an output drive shaft attached to said rotor to allow power takeoff from said rotary engine.

10. A robust rotary engine having operating temperatures exceeding 850° F. comprising
    a) an uncooled cylindrical cast iron housing having a peripheral wall with an internal surface coated with a ceramic coating;
    b) a rotor offset within said housing;
    c) a plurality of vanes associated with said rotor in a manner such that said vanes rotate with said rotor while being permitted radial sliding movement relative thereto, said radial sliding being accomplished solely by contact between end portions of said vanes and said internal surface of said cylindrical housing;
    d) an intake orifice; and
    e) an exhaust orifice;
    whereby temperatures within said uncooled cylindrical housing reach temperatures exceeding 850° F.

11. The rotary engine of claim 10 further comprising a plurality of grooves in said internal surface of said peripheral wall beginning downstream of said intake orifice, said plurality of grooves extending over a distance generally equal to one quadrant of said peripheral wall;
    whereby expanding gases bypass at least one proximate vane when an end portion of said proximate vane is in contact with said internal surface, said expanding gases engaging a vane which is not proximate said internal surface.

12. The rotary engine of claim 11 further comprising a plurality of injection ports positioned about a periphery of said rotary housing along a length of said grooves for injection of at least one of substances selected from a group consisting of fuel and water.

13. The rotary engine of claim 12 wherein said fuels are selected from a group consisting of gasoline, diesel fuel, and substitute hybrid hydrocarbons.

14. A rotary engine comprising
    a) a cylindrical housing having a peripheral wall with an internal surface;
    b) a rotor offset within said housing;
    c) a plurality of solid vanes, each of said solid vanes extending entirely through said rotor and having two ends simultaneously engaging opposing portions of said internal surface of said peripheral wall, said solid vanes being associated with said rotor in a manner permitting said vanes to rotate with said rotor while simultaneously being permitted radial sliding movement relative thereto;
d) an intake orifice;
e) an exhaust orifice; and
f) means permitting expanding gases to bypass at least one proximate vane whereby expanding gases bypass at least one proximate vane when an end portion of said proximate vane is in contact with said internal surface, said expanding gases engaging a vane which is not proximate said internal surface which has a greater surface area exposed than a surface area of said proximate vane.

15. The rotary engine of claim 14 further comprising a plurality of roller bearings which engage lateral portions of each of said vanes facilitating their longitudinal sliding movement.

16. The rotary engine of claim 15 wherein said plurality of rollers bearings comprise at least two pairs of roller bearings engaging each vane.

17. The rotary of engine of claim 16 wherein said at least two pair of roller bearings comprise at least six pair of roller bearings, three said pair at each of said first and second ends.

18. The rotary engine of claim 14 wherein said means permitting expanding gases to bypass at least one vane comprises a plurality of grooves in said internal surface of said peripheral wall beginning downstream of said intake orifice, said plurality of grooves extending over a distance generally equal to one quadrant of said peripheral wall.

19. The rotary engine of claim 18 further comprising a plurality of injection ports positioned about a periphery of said rotary housing along a length of said grooves.

* * * * *